(12) United States Patent
Pan et al.

(10) Patent No.: US 9,867,102 B2
(45) Date of Patent: Jan. 9, 2018

(54) METHOD FOR RESISTING SMALL BASE STATION UPLINK SIGNAL INTERFERENCE OF INDOOR DAS SYSTEM BASED ON ANTENNA SELECTION

(71) Applicant: SUNWAVE COMMUNICATIONS CO., LTD., Hangzhou, Zhejiang Province (CN)

(72) Inventors: Peng Pan, Hangzhou (CN); Xin Chen, Hangzhou (CN); Junrong Yan, Hangzhou (CN); Yingbiao Yao, Hangzhou (CN)

(73) Assignee: SUNWAVE COMMUNICATIONS CO., LTD., Hangzhou (CN)

( * ) Notice: Subject to any disclaimer, the term of this patent is extended or adjusted under 35 U.S.C. 154(b) by 0 days.

(21) Appl. No.: 15/540,588

(22) PCT Filed: Dec. 23, 2015

(86) PCT No.: PCT/CN2015/098444
§ 371 (c)(1),
(2) Date: Jun. 29, 2017

(87) PCT Pub. No.: WO2016/107476
PCT Pub. Date: Jul. 7, 2016

(65) Prior Publication Data
US 2017/0359763 A1    Dec. 14, 2017

(30) Foreign Application Priority Data

Dec. 29, 2014  (CN) .......................... 2014 1 0842946

(51) Int. Cl.
*H04W 36/20*    (2009.01)
*H04B 7/04*     (2017.01)
*H04W 36/04*    (2009.01)

(52) U.S. Cl.
CPC .............. *H04W 36/20* (2013.01); *H04B 7/04* (2013.01); *H04W 36/04* (2013.01)

(58) Field of Classification Search
None
See application file for complete search history.

(56) References Cited

U.S. PATENT DOCUMENTS

| | | | | |
|---|---|---|---|---|
| 2011/0261711 A1* | 10/2011 | Kronestedt | .......... | H04B 7/0608 370/252 |
| 2014/0219162 A1* | 8/2014 | Eyuboglu | ............. | H04W 16/26 370/315 |

(Continued)

*Primary Examiner* — David Bilodeau
(74) *Attorney, Agent, or Firm* — PROI Intellectual Property US

(57) ABSTRACT

The present invention provides a method for resisting small base station uplink signal interference of an indoor DAS based on antenna selection. The method comprises: step 1: determining an initial access RU, and establishing an uplink; step 2: determining, by the access RU of UE 1 on the basis of the level of interference, whether to switch to another RU, and continuously detecting, by the access RU of UE 1 an SINR value at a set time interval, and comparing the SINR with a preset threshold value γ1; wherein if the SINR value is lower than γ1, an MU sets the access RU and each peripheral RU as a candidate RU, and the MU, on the basis of the acquired SINR value of each RU, selects an SINR greater than γ1 and sets the RU having the greatest receiving signal power as the new access RU of UE 1.

2 Claims, 4 Drawing Sheets

(56) References Cited

U.S. PATENT DOCUMENTS

| | | | |
|---|---|---|---|
| 2014/0363156 A1* | 12/2014 | Gong | H04W 24/10 398/25 |
| 2017/0064676 A1* | 3/2017 | Lee | H04B 7/04 |
| 2017/0180186 A1* | 6/2017 | Kim | H04L 41/06 |

* cited by examiner

METHOD FOR RESISTING SMALL BASE STATION UPLINK SIGNAL INTERFERENCE OF INDOOR DAS SYSTEM BASED ON ANTENNA SELECTION

CROSS REFERENCE TO RELATED APPLICATIONS

The present application is the US national stage of International Patent Application PCT/CN2015/098444 filed on Dec. 23, 2015, which, in turn, claims priority to Chinese Patent Application CN 201410842946.2 filed on Dec. 29, 2014.

TECHNICAL FIELD

The present invention pertains to the field of mobile communications, relates to a method of resisting co-channel interference between cells, and in particular, relates to a method for resisting small base station uplink signal interference of an indoor distributed antenna system (DAS) based on antenna selection.

BACKGROUND

With the popularity of smart terminals, demands on wireless data service experiences an explosive increase. As predicted, from 2010 to 2015, global mobile data traffic experiences a 24-fold increase, during 10 years from 2010 to 2020, the traffic will see a 500-fold increase. This is a great challenge for the service providing capabilities of the operators. Generally, mobile services of cellular networks are obviously inhomogeneous. According to statistics, about 60% of voice services and 90% of data services are provided indoors. Therefore, for the operators, providing good indoor coverage is an important means to keep customer retention and improve enterprise benefits. However, according to a survey, about 45% of families and 30% of enterprises confront the problem of poor indoor coverage. This is because the current means of providing indoor coverage are mostly based on outdoor macro-cell base stations, and the signals are subject to a high loss when penetrating through the walls.

At present, means of providing indoor coverage include a relay, an indoor DAS, a radiation cable, a small base station and the like. The relay and the radiation cable are gradually replaced by the indoor DAS and the small base station for the reason of complicated assembling. In general, the indoor DAS provides a universal signal coverage for a large-scale indoor environment, but cannot improve capacity for the reason that antenna units are connected to the same base station. Therefore, with an explosive increase of traffic of smart phones and tablet PCs, the indoor DAS would fail to accommodate the requirements. The small base station can solve data capacity problem via deployment of indoor hot spot regions, but cannot cover all regions of a big-scale building. Therefore, in a long time in the future, hybrid deployment of the indoor DAS and the small base station system is very likely to be implemented, so as to effectively provide data capacity and signal coverage.

However, the hybrid deployment of the indoor DAS and the small base station may cause mutual interference. In particular, after 3GPP LTE proposes full-frequency multiplexing to further improve spectrum utilization rate, such mutual interference may be inevitably a critical factor affecting the system performance. At present, to prevent co-channel interference, 3GPP LTE proposes interference prevention method based on interference coordination, and desires to prevent interference by means of orthogonality in the time domain or audio domain. However, these interference coordination manners are all based on small base stations and macro base station, and the small base station and the macro base station have an obvious difference in terms of spatial position. In combination with power control, interference prevention may be achieved. In the small base station and the indoor DAS, the small base station and the indoor DAS substantially overlap in terms of space. In addition, considering the feature of plug-and-play of the small base station, an interference coordination-based method is current developed, for example, ICIC, eICIC and FeICIC, which may not be directly used in interference coordination of the small base station system and the indoor DAS. Therefore, an interference suppression method needs to be redesigned according to the features such as indoor deployment and distributed deployment of the DAS, such that the DAS is capable of normally operating in an environment where interference from the small base station is present.

SUMMARY

To overcome the problem that an uplink of an indoor DAS is subject to interference of an uplink of a small base station in hybrid deployment of the indoor DAS and the small base station, considering the distributed and multi-antenna-equipped DAS, the present invention provides a method for resisting small base station uplink signal interference of an indoor DAS based on antenna selection, specifically, a method for resisting indoor small base station uplink co-frequency signal interference in the indoor DAS.

A technical solution according to the present invention for solving the technical problem is provided. Before description of specific steps of the present invention, some abbreviations and symbols are firstly defined. A main unit of the indoor DAS is represented by MU; a remote unit and an antenna connected thereto are represented by an RU, and RUn (n being a natural number of 1, 2, 3, . . . ) is defined as the nth RU. UE 1 represents a terminal accessing the DAS. Signal to interference plus noise ratio is represented by SINR, and is a ratio of power of signals to power of interference plus noise. The steps of the present invention relates to a threshold of the SINR, which is represented by $\gamma 1$, and when the SINR of a received signal of an RU is less than $\gamma 1$, the RU is subjected to severe interference and shall not be used.

The method for resisting small base station uplink signal interference of an indoor DAS based on antenna selection according to the present invention comprises the following steps:

step 1: determining an initial access RU, and establishing an uplink;

wherein when attempting to access a DAS, UE 1 sends an access request to the DAS; the DAS assigns an RU with a strongest received signal strength to UE 1 as an access RU thereof according to signal powers of the access requests received by the RUs, and establishes an uplink; and the RU is a remote unit and an antenna connected thereto, and UE 1 is a terminal accessing the DAS;

step 2: determining, by the access RU of UE 1, whether to switch to another RU according to an interference level;

wherein the access RU of UE 1 constantly detects an SINR value at an interval of a specific time, compares the SINR value with a predetermined threshold $\gamma 1$ to determine whether the interference level affects communication, and performs the following operations according to the SINR value:

(1) if the SINR value is less than γ1, the DAS performs the following steps:

step 201a: the access RU of UE 1 sends a message to an MU indicating that severe interference is caused to the RU and UE 1 needs to switch to another RU; wherein the MU is a main unit of the indoor DAS;

step 202a: the MU designates the access RU and adjacent RUs as candidate RUs, and sends an instruction to the candidate RUs to instruct the candidate RUs to detect a receive power and an SINR value when UE 1 receives a signal;

step 203a: each of the candidate RUs detects an SINR value and a received signal power of the RU, and reports the SINR value and the received signal power to the MU;

step 204a: the MU selects an RU with the SINR greater than γ1 and with a maximum received signal power as a new access RU of UE 1 according to the obtained SINRs of the RUs; and step 205a: UE 1 establishes an uplink with the new access RU, and step 201b is performed:

(2) if the SINR value is less than γ1, the DAS performs the following steps:

step 201b: UE 1 maintains the uplink with the access RU, and the RU continues to constantly detect the SINR value at an interval of a specific time; and if the SINR value is less than γ1, steps 201a to 205a are performed.

Preferably, the predetermined threshold γ1 has a value of −3 dB to 3 dB.

The present invention achieves the following beneficial effects:

(1) No coordination mechanism needs to be established (sharing information) between the DAS and the small base station, and thus requirements on the feedback link are lowered.

(2) Interference-caused impacts are mitigated by switching between different RUs, the practice is simple, no complicated signal technology is required, and the present invention may be practiced by simple software and hardware upgrade in the conventional DAS.

(3) The SINR and the received signal power are both considered, and the problem caused by over-low received signal power for attaining SINR is avoided, for example, the requirements on flexibility of radio frequency front end of the RU.

DETAILED DESCRIPTION

The present invention is further described hereinafter with reference to the accompanying drawings.

Figure 1:
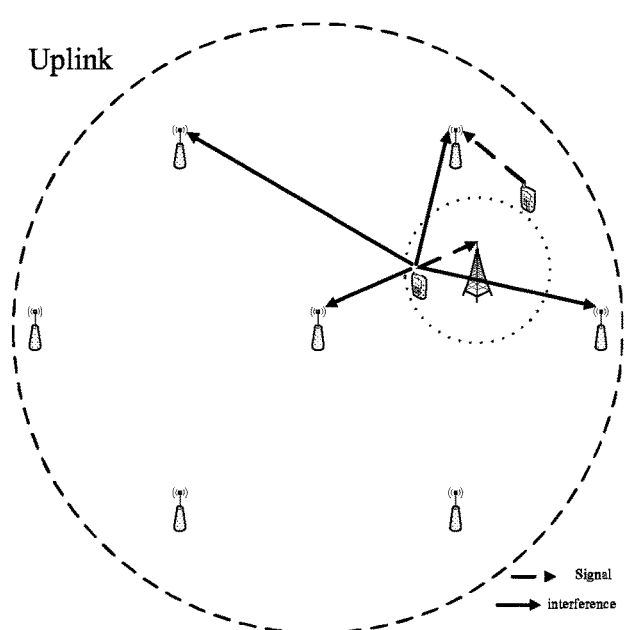
FIG. 1 is a schematic diagram illustrating interference caused by small base station uplink signals to DAS uplink signals.

FIG. 1 is a schematic diagram illustrating a specific application scenario according to the present invention. The application scenario includes a DAS system and a small base station system. In general, the DAS improves indoor signal coverage by means of multiple of RUs distributed in buildings, but cannot enhance network capacity. The small base station is used to cover hot spot regions, which may effectively improve capacity. However, with respect to large buildings, a universal coverage similar to the DAS cannot be implemented. Therefore, in a long period of time, the DAS and the small base station system are hybridly deployed. As such, the universal signal coverage of the buildings is satisfied, and capacity requirements of the hot spot regions are accommodated. In this scenario, co-channel interferences between the DAS and the small base station system will become a very important factor restricting system performance. In general, if the indoor DAS system and the small base station are hybridly deployed, mutual interference may be generated in the uplink, that is, the uplink of the DAS interferes with the uplink of the small base station, and meanwhile, the uplink of the small base station also interferes with the uplink of the DAS. As illustrated in FIG. 1, when a terminal accessing the small base station performs uplink transmission, a received signal of RUs in the DAS may be interfered, and otherwise, the interference is still caused. Since functions of the RUs in the DAS are relatively single, the capability of the DAS to suppress interference is poor. On the contrary, the small base station may be complicatedly built, and the terminal accessing the small base station is few. Therefore, the capability of the small base station to resist uplink interference of the DAS is also poor. Based on this reason, in this embodiment, the problem that the DAS resists small base station uplink interference is emphatically considered, and a method based on antenna selection is provided to improve a signal-to-noise ratio of a received signal of the DAS. In this way, influences brought from the small base station uplink interference are prevented.

Figure 2:
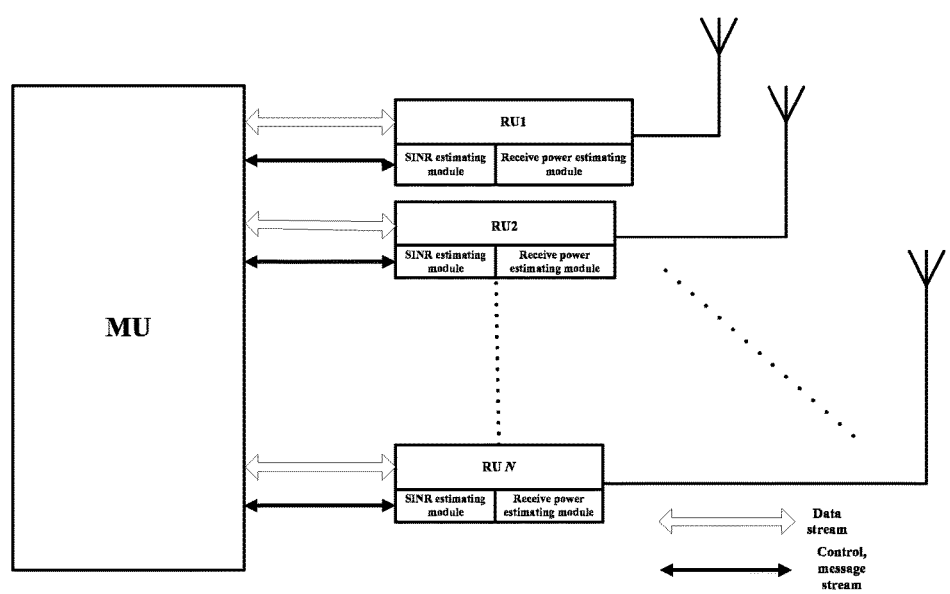
FIG. 2 is a schematic diagram of a DAS according to the present invention.

FIG. 2 is a schematic diagram of an indoor DAS according to the present invention. The indoor DAS mainly comprises an MU and a plurality of RU modules. The functions of the MU related to the present invention are as follows:

1) managing the RUs, and selecting an access RU of UE 1 according to the provided SINR value and received signal power; and 2) controlling switching between RUs, such that UE 1 maintains a stable switching.

The functions of the MU related to the present invention are as follows:

1) estimating an SINR value and a received signal power of a received signal; and 2) sending values of the SINR and receive power and the corresponding notification to the MU.

Figure 3:
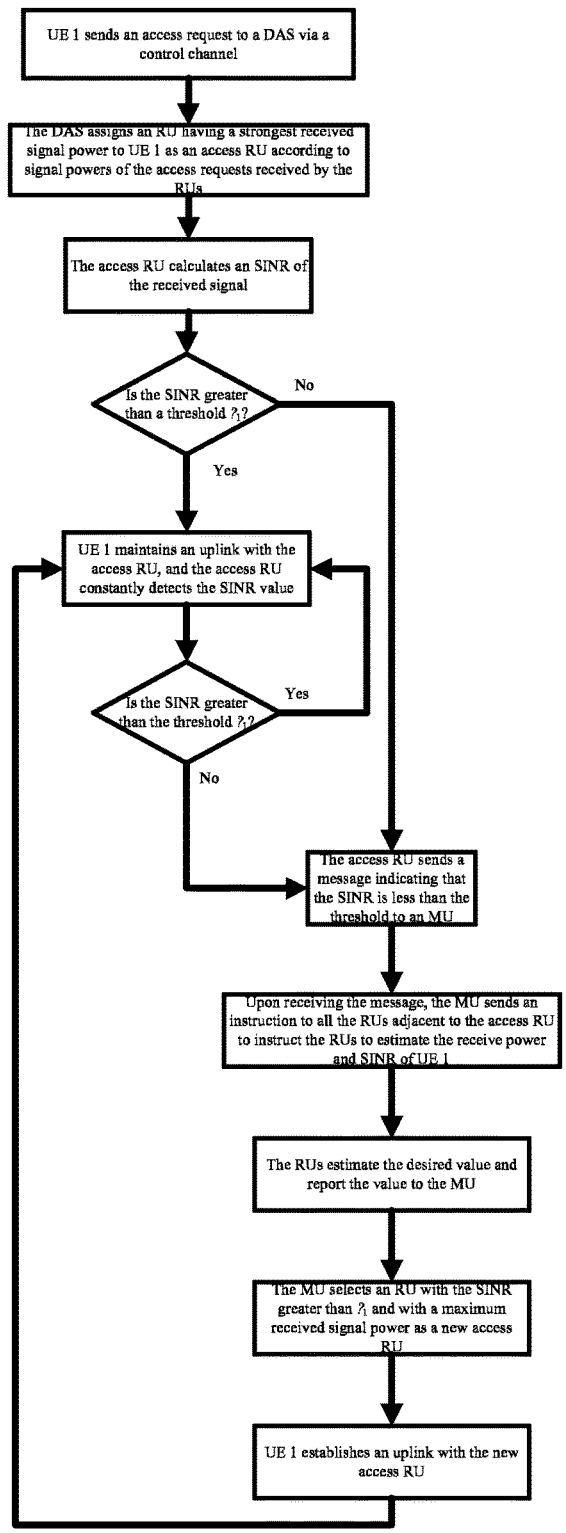
FIG. 3 is a flowchart illustrating antenna selection according to the present invention.

FIG. 3 is a flowchart of downlink interference prevention between an indoor DAS and a small base station. With reference to the scenario as illustrated in FIG. 4, specific embodiments are described for the problem solving flowchart illustrated in FIG. 3.

Figure 4:
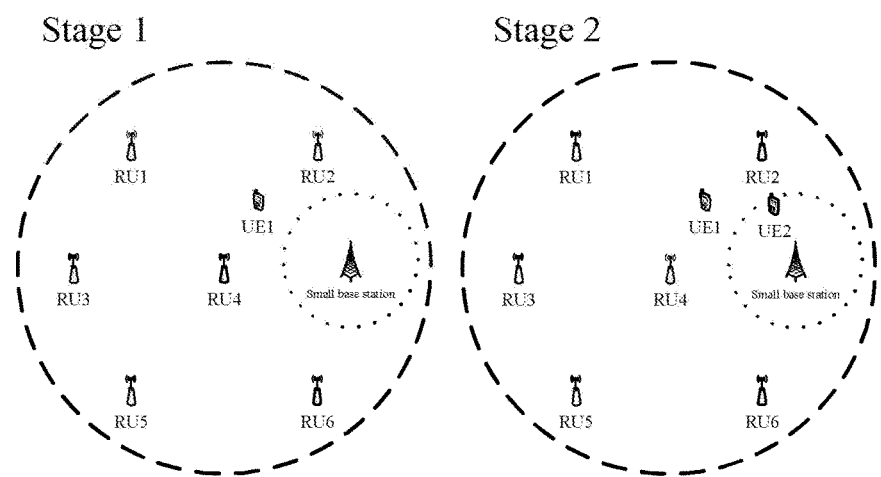
FIG. 4 illustrating a specific embodiment according to the present invention.

In the embodiment illustrated in FIG. 4, the DAS totally has six RUs, and a small base station is deployed in the DAS. In this embodiment, assume that the distances from UE 1 to the six RUs are respectively [15, 7, 20, 8, 25, 22], and the distances from UE 2 to the six RUs are respectively [20, 5, 27, 10, 28, 22]. Assume that transmit powers of UE 1 and UE 2 are the same, γ1 is 1 (that is, 0 dB), path loss is inversely proportional to cube of the distance, and signal to noise ratio of a received signal is 10 dB. In a whole communication time period of UE 1 and the DAS, UE 2 accesses the small base station only in a while of of the time period (stage 2 as illustrated in FIG. 4).

Referring to step 1, UE 1 sends an access request to the DAS; the RUs receive the signal, estimate a received signal power, and report the estimated value to the MU. In this embodiment, since UE 1 is closest to RU 2, the received signal power of RU 2 is the strongest, and the DAS uses RU 2 as an access RU of UE 1. RU 2 thus establishes the uplink with UE 1.

Step 2: RU 2 detects the SINR value at an interval of a specific time, and compares the SINR value with a predetermined threshold γ1.

In this embodiment, since there is no interference caused by UE 2 at this moment, the SINR value acquired by RU 2 is actually signal to noise ratio, the signal to noise ratio is 10 dB greater than γ1, and step 201b is performed.

Step 201b: UE 1 maintains the uplink with RU 2, and RU 2 continues to constantly detect the SINR at an interval of a specific time.

Before UE 2 accesses the small base station, that is, at stage 1 illustrated in FIG. 4, the DAS is always in the operation of step 201b until UE 2 accesses the small base station, that is, at stage 2 illustrated in FIG. 4. In this case, the SINR value detected by RU 2 is about 0.36 (that is, −4.4 dB) less than γ1, and steps 201a to 205a are performed by the DAS.

RU 2 sends a message to the MU and informs the MU of the SINR value, which indicates that severe interference is caused to RU 2 and RU 2 needs to switch to another RU.

Step 202a: The MU designates RU 2 and RUs adjacent to the RU 2 as candidate RUs. In this embodiment, RU 1, RU 4 and RU 6 send an instruction to the candidate RUs to instruct the candidate RUs to detect a receive power and the SINR value when UE 1 receives a signal.

Step 203a: Each of the candidate RUs detects an SINR value and a received signal power of the RU, and reports the SINR value and the received signal power to the MU.

In this embodiment, the SINR value estimated by RU 1 is about 2.37, the SINR value estimated by the RU 2 is about 0.36, the SINR value estimated by RU 4 is about 1.95, and the SINR value estimated by RU 6 is about 1. Meanwhile, the received signal power of UE 1 in a descend order is RU 2, RU 4, RU 1 and RU 6.

step 204a: The MU selects an RU with the SINR greater than γ1 and with a maximum received signal power as a new access RU of UE 1.

In this embodiment, the RUs greater than threshold γ1 are RU 1, RU 4 and RU 6. RU 1 has a maximum SINR value. However, RU 1 is not selected as an access RU of UE 1 in the present invention, the RU with a strongest received signal strength is selected from the RUs with the SINR greater than the threshold, and in this embodiment, RU 4 is selected.

Step 205a: UE 1 establishes an uplink with RU 4, and step 201b is performed by the DAS.

The above embodiments are merely exemplary embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for resisting small base station uplink signal interference of an indoor distributed antenna system (DAS) based on antenna selection, the method comprising the following steps:

determining an initial access RU, and establishing an uplink; wherein when attempting to access a DAS, UE 1 sends an access request to the DAS; the DAS assigns an RU with a strongest received signal power to UE 1 as an access RU thereof according to signal powers of the access requests received by the RUs, and establishes an uplink; and the RU is a remote unit and an antenna connected thereto, and UE 1 is a terminal accessing the DAS;

determining, by the access RU of UE 1, whether to switch to another RU according to an interference level; wherein the access RU of UE1 constantly detects an signal to interference plus noise ratio (SINR) value at an interval of a specific time, compares the SINR value with a predetermined threshold y1 to determine whether the interference level affects communication, and performs the following operations according to the SINR value:

(1) if the SINR value is greater than y1, the DAS performs the following steps:

UE 1 maintains the uplink with the access RU, and the RU continues to constantly detect the SINR value at an interval of a specific time; and (2) if the SINR value is less than y1, the DAS performs the following steps:

the access RU of UE 1 sends a message to an MU indicating that severe interference is caused to the RU and UE1 needs to switch to another RU; wherein the MU is a main unit of the indoor DAS;

the MU designates the access RU and adjacent RUs as candidate RUs, and sends an instruction to the candidate RUs to instruct the candidate RUs to detect a receive power and an SINR value when receiving a signal from UE1;

each of the candidate RUs detects an SINR value and a received signal power of the UE1, and reports the SINR value and the received signal power to the MU;

the MU selects a candidate RU with the SINR greater than y1 and with a maximum received signal power as a new access RU of UE 1; and UE 1 establishes an uplink with the new access RU, and UE 1 maintains the uplink with the new access RU, and the new access RU continues to constantly detect the SINR value at an interval of a specific time.

2. The method according to claim 1, wherein the predetermined threshold γ1 has a value of −3 dB to 3 dB.

* * * * *